United States Patent
Chrysos et al.

(10) Patent No.: US 9,678,907 B2
(45) Date of Patent: *Jun. 13, 2017

(54) OLDEST LINK FIRST ARBITRATION BETWEEN LINKS GROUPED AS SINGLE ARBITRATION ELEMENTS

(71) Applicant: International Business Machines Corporation, Armonk, NY (US)

(72) Inventors: Nikolaos Chrysos, Thalwil (CH); Brian T. Vanderpool, Byron, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 345 days.

This patent is subject to a terminal disclaimer.

(21) Appl. No.: 14/252,441

(22) Filed: Apr. 14, 2014

(65) Prior Publication Data

US 2015/0278136 A1 Oct. 1, 2015

Related U.S. Application Data

(63) Continuation of application No. 14/225,781, filed on Mar. 26, 2014.

(51) Int. Cl.
*G06F 13/362* (2006.01)
*G06F 13/40* (2006.01)
*G06F 13/42* (2006.01)
*G06F 13/26* (2006.01)
*G06F 13/372* (2006.01)

(52) U.S. Cl.
CPC ........ *G06F 13/362* (2013.01); *G06F 13/4022* (2013.01); *G06F 13/26* (2013.01); *G06F 13/372* (2013.01); *G06F 13/4221* (2013.01)

(58) Field of Classification Search
CPC ........ G06F 13/14; G06F 13/36; G06F 13/362; G06F 13/364; G06F 13/368; G06F 13/374; G06F 13/4022; G06F 13/4031; H04L 2012/5678; H04L 2012/5679; H04L 49/101
See application file for complete search history.

(56) References Cited

U.S. PATENT DOCUMENTS

| | | | |
|---|---|---|---|
| 5,710,549 A | 1/1998 | Horst et al. | |
| 6,487,213 B1 | 11/2002 | Chao | |
| 7,020,131 B1 | 3/2006 | Yun et al. | |
| 7,161,906 B2* | 1/2007 | Dell | H04L 49/1576 370/231 |
| 7,170,903 B2 | 1/2007 | Alasti et al. | |
| 7,643,493 B1* | 1/2010 | Sayrafian-Pour | H04L 49/254 370/231 |
| 7,764,689 B2 | 7/2010 | Bernick et al. | |

(Continued)

*Primary Examiner* — Thomas J Cleary
(74) *Attorney, Agent, or Firm* — Patterson + Sheridan, LLP

(57) ABSTRACT

A method for scheduling a crossbar using distributed request-grant-accept arbitration between input group arbiters and output group arbiters in a switch unit is provided. Each input group arbiter and output group arbiter maintains an ordered queue of links in an input group or an output group. The ordered queue prioritizes links in the output group or output group that was least recently selected. To satisfy an arbitration slot won on the group-level, the input group arbiter or output group arbiter starts a search from the oldest link that was selected and maintains fairness among links in the group.

7 Claims, 10 Drawing Sheets

(56) References Cited

U.S. PATENT DOCUMENTS

| | | | | |
|---|---|---|---|---|
| 7,830,902 B2* | 11/2010 | Ichimiya | ............ | G06F 13/1657 |
| | | | | 370/412 |
| 8,984,206 B2* | 3/2015 | Chrysos | ............ | G06F 13/4022 |
| | | | | 710/112 |
| 9,323,703 B2* | 4/2016 | Srivastava | ............ | G06F 13/37 |
| 9,336,169 B2* | 5/2016 | Srivastava | ............ | G06F 13/37 |
| 2002/0048280 A1* | 4/2002 | Lee | ........................ | H04L 47/10 |
| | | | | 370/468 |
| 2004/0083326 A1* | 4/2004 | Wang | .................. | G06F 13/4022 |
| | | | | 710/317 |
| 2004/0120337 A1* | 6/2004 | Jun | .................... | H04L 47/6225 |
| | | | | 370/413 |
| 2005/0060457 A1* | 3/2005 | Olukotun | ............ | G06F 9/3851 |
| | | | | 710/240 |
| 2006/0002412 A1* | 1/2006 | Bose | ........................ | G06F 13/36 |
| | | | | 370/412 |
| 2010/0272117 A1* | 10/2010 | Wu | ....................... | H04L 49/101 |
| | | | | 370/413 |
| 2011/0138098 A1* | 6/2011 | Satpathy | .................. | G11C 7/10 |
| | | | | 710/317 |
| 2012/0002677 A1* | 1/2012 | Hataida | ................ | H04L 49/101 |
| | | | | 370/412 |
| 2015/0063348 A1* | 3/2015 | Chrysos | ............. | H04L 49/3063 |
| | | | | 370/355 |
| 2015/0229576 A1* | 8/2015 | Baratam | ............. | H04L 47/6215 |
| | | | | 370/413 |
| 2015/0229577 A1* | 8/2015 | Baratam | ............. | H04L 47/6215 |
| | | | | 370/415 |
| 2015/0278135 A1* | 10/2015 | Chrysos | ................ | G06F 13/362 |
| | | | | 710/113 |
| 2015/0295858 A1* | 10/2015 | Chrysos | ................ | H04L 49/101 |
| | | | | 370/412 |

\* cited by examiner

OLDEST LINK FIRST ARBITRATION BETWEEN LINKS GROUPED AS SINGLE ARBITRATION ELEMENTS

CROSS-REFERENCE TO RELATED APPLICATIONS

This application is a continuation of co-pending U.S. patent application Ser. No. 14/225,781, filed Mar. 26, 2014. The aforementioned related patent application is herein incorporated by reference in its entirety.

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the present disclosure provide a computer-implemented method for a method for scheduling a crossbar using distributed request-grant-accept arbitration between input group arbiters and output group arbiters in a switch unit. The method includes receiving, at a group arbiter communicably coupled to a group comprising a plurality of links of the switch unit, an indication that the group has won an arbitration slot. Multiple links of the group are candidates may be able to satisfy the arbitration slot. The method further includes determining a first link identifier having a highest priority within an ordered queue among link identifiers in the ordered queue matching the candidates able to satisfy the arbitration slot. The method includes selecting a first link of the group corresponding to the first link identifier to satisfy the arbitration slot, and updating, by operation of one or more computer processors, the ordered queue based on the selected first link. The first link identifier may be moved to a bottom of the ordered queue.

Embodiments of the present disclosure further provide a computer program product computer program product for scheduling a crossbar using distributed request-grant-accept arbitration between input group arbiters and output group arbiters in a switch unit. The computer program product includes a computer-readable storage medium having computer-readable program code embodied therewith. The computer-readable program code includes computer-readable program code configured to receive, at a group arbiter communicably coupled to a group comprising a plurality of links of the switch unit, an indication that the group has won an arbitration slot. One or more links of the group are candidates may be able to satisfy the arbitration slot. The computer-readable program code further includes computer-readable program code configured to determine a first link identifier having a highest priority within an ordered queue among link identifiers in the ordered queue matching the candidates able to satisfy the arbitration slot. The computer-readable program code further includes computer-readable program code configured to select a first link of the group corresponding to the first link identifier to satisfy the arbitration slot, and computer-readable program code configured to update the ordered queue based on the selected first link. The first link identifier may be moved to a bottom of the ordered queue.

Embodiments of the present disclosure further provide an apparatus having a plurality of links organized into groups including a first group. The apparatus includes an arbitration element comprising a plurality of group arbiters including a first group arbiter. The first group arbiter is communicably coupled to the first group of links. The first group arbiter includes a shift register storing a plurality of link identifiers corresponding to the links of the first group, a first plurality of multiplexors connected to the shift register, and a priority encoder connected to the first plurality of multiplexors. A location of a link identifier within the shift register designates a priority of the corresponding link. The first plurality of multiplexors are configured to match the link identifiers contained in the shift register with a bit vector indicating one or more links of the first group are able to satisfy an arbitration slot. The priority encoder is configured to determine a first link identifier having a highest priority among link identifiers matching the bit vector. The priority encoder is further configured to select a first link of the first group corresponding to the first link identifier. The first group arbiter further includes a second plurality of multiplexors connected to the shift register and configured to update the shift register based on the selected first link.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

Figure 1:
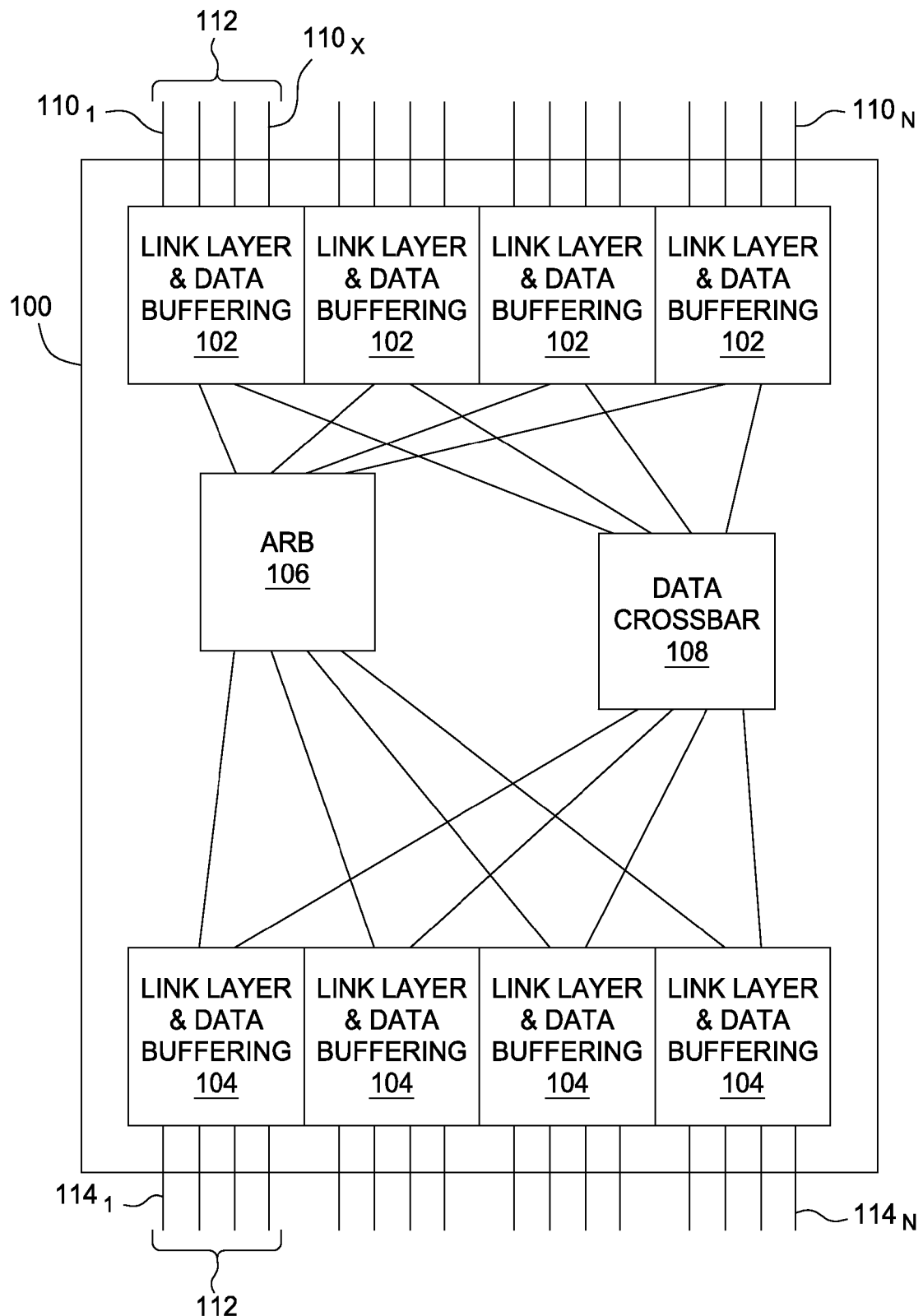
FIG. 1 is a block diagram depicting a switch unit configured to implement hierarchical high radix switching using a time-sliced crossbar, according to embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments disclosed herein provide techniques to implement a fair scheduling scheme for a crossbar scheduler that provides distributed request-grant-accept arbitration between input arbiters and output arbiters in a distributed switch. Crossbars are components serving as basic building blocks for on-chip interconnects and large, off-chip switching fabrics, such as those found in data centers. High-radix crossbars, i.e., crossbars with many ports, are often desired, as they allow creating large networks with fewer silicon chips and thus for a lower cost. Despite technology scaling, crossbar port scaling may be restricted by the quadratic cost of crossbars, as well as by the targeted port speed, which also increases from one silicon generation to the next. Even where routing a large number of wires in a small area of silicon seems feasible on paper, placement-and-routing tools may often find it difficult to achieve efficient routing of such a large number of wires.

The same may hold true for crossbar schedulers, which should preferably also scale together with the crossbar data-path. Crossbar schedulers may often be based on a distributed request-grant arbitration, between input and output arbiters. Flat schedulers, having one arbiter for each input and output port, may often achieve the best delay-throughput and fairness performance.

However, routing wires between N input and N output arbiters may require a full-mesh interconnect, with quadratic cost, which may become expensive for crossbars with more than 64 ports. To overcome this cost, hierarchical scheduling solutions may be used. To that end, inputs may be organized in groups—for example, quads—and arbitration is performed at the quad level rather than at an individual input level. An input arbiter may also be referred to herein as an input group arbiter, and an output arbiter may also be referred to herein as an output group arbiter.

Although quad-based scheduling reduces the number of wires that are to be routed within the chip area dedicated to the crossbar scheduler, quad-based scheduling may also compromise fairness at least in some instances. While fairness may be provided at the quad-level, i.e., that all input quads get the same service from each output subport, maintaining fairness on the port-level may be challenging because of the loss of information in consolidating requests from links within a quad. In one instance, the challenge of maintain fairness arises when an arbitration element has won arbitration, and multiple links within a quad can claim the winning slot, be it in the grant phrase or the accept phase of an request/grant/accept protocol.

Other approaches, such as round-robin algorithms or pseudo-random resolution algorithms, have been attempted. However, since multiple input links are contending for multiple outputs, using a round-robin can result in timing mismatches between inputs and outputs, i.e., timing mismatches between when an input link is able to make a request and the output is willing to grant that request for the particular output link. Such a round-robin pointer might skip links that were not even busy, thereby preventing a link from making forward progress. Using a pseudo-random bit sequence such as from a linear feedback shift register (LFSR) algorithm can result in a scheduling imbalance, e.g., if only three links have an active request, two of the values from the random number bit sequence would map to one of the links. Results from the pseudo-random bit sequence could be mapped to the number of active links, e.g., use two LFSR bits to generate a random number 0-2 (for three active links) instead of the normal 0-3 (for all four links). However, any inherent unfairness in the LFSR may still be present in balancing traffic between links.

Accordingly, one embodiment provides an operation to implement a scheduling scheme for a crossbar scheduler that provides distributed request-grant-accept arbitration between input group arbiters and output group arbiters in a switch unit. When an arbitration element (e.g., input group arbiter, output group arbiter) receives a notification that it has won arbitration, the arbitration element looks at which links can satisfy the arbitration slot. It is possible that more than one link can satisfy the slot. As such, embodiments perform a search, matching the possible winning links to link identifiers stored in an ordered queue. The matching link with the link identifier in a position of highest priority within the ordered queue will be selected, and then that link identifier will be placed at the bottom of the ordered queue, shifting identifiers behind it up by one. Accordingly, embodiments provide a solution for resolving fairness between multiple entities grouped into one arbitration element, where a least recently chosen link is elevated to the highest priority over time.

In the following, reference is made to embodiments of the present disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

FIG. 1 is a block diagram depicting a switch unit 100 configured to implement hierarchical high radix switching using a time-sliced crossbar, according to embodiments of the present disclosure. The switch unit 100 may include a plurality of input ports 110, a plurality of output ports 114, a plurality of link layer and data buffering logic blocks 102 and 104, an arbitration element 106, and a data crossbar 108. While the input ports 110 and output ports 114 (as well as logic blocks 102, 104) are depicted as separate, it is noted that they logically represent different passes through the same ports and logic blocks, before and after being routed through the data crossbar 108 of the switch unit 100.

In one embodiment, the plurality of ports 110, 114 are configured to transmit and receive data packets to and from the switch unit 100 via links connected to the ports 110, 114. The ports 110, 114 may be grouped together to form groups 112 of ports, and scheduling packet transfers between ports (i.e., arbitration) is performed at the group level. A switch port within a group 112 may be sometimes referred to as a subport. In the embodiment shown, the switch unit 100 includes N input ports (e.g., $110_1$ to $110_N$) and N output ports (e.g., $114_1$ to $114_N$) grouped in Y groups of X ports (e.g., $110_1$ to $110_x$), such that X*Y=N, although other arrangements of port groupings, such as groups having different numbers of subports, and other configurations of switch unit 100, including a switching connecting N inputs to M outputs, may be used. For clarity of illustration, the following disclosure describe one exemplary switch unit 100 configured as a 136×136 port switch, where 4 ports are grouped together to form a group, referred to interchangeably as a quad, resulting in 34 quads (i.e., N=136, X=4, Y=34).

As shown in FIG. 1, each group 112 of ports may have corresponding logic blocks 102, 104 that handles the data buffering and link layer protocol for that group of subports. In one embodiment, a link layer portion of logic blocks 102 is configured to manage the link protocol operations of the switch unit 100, which may include credits, error checking, and packet transmission. In one embodiment, a data buffering portion of logic block 102 is configured to receive incoming packet "flits" (flow control digits) and buffers these flits in a data array. In one example, data buffering portion of logic block 102 may receive incoming packet flits, up to two flits per cycle, and buffers the flits in an 8-flit wide array. The data buffering portion of logic blocks 102 may be further configured to handle sequencing of an arbitration-winning packet out to the data crossbar 108, as well as receiving incoming crossbar data to sequence to an output link.

The arbitration element 106 may include a plurality of input arbiters and a plurality of output arbiters that coordinate to perform an arbitration operation based on a request/grant/accept protocol, as described in greater detail below. In one embodiment, the arbitration element 106 may include at least one input arbiter and at least one output arbiter associated with each group 112. For example, the arbitration element 106 may include 34 input arbiters and 34 output arbiters (e.g., Y=34). An input arbiter associated with a particular group 112 may be configured to queue incoming packet destination information and manage active transfers from that input group. An output arbiter may be configured to track outgoing subport availability and provide fairness in scheduling through the use of a per-subport "next-to-serve" pointer.

In operation, the destinations of incoming packets received by an input group 112 are unified together (e.g., via a logical OR operation) such that the particular group makes a single packet transfer request to the arbitration element 106, rather than multiple requests for the individual subports. The arbitration element 106 looks at all the requests from all groups 112, looks at the availability of the output ports, and determines which group 112 gets to start a packet transfer, sometimes referred to as "winning" arbitration. When a particular packet wins arbitration, the arbitration element 106 signals to an input data buffer (e.g., within logic block 102) to start a packet transfer, signals the data crossbar 108 to route the data to the correct output data buffer, and signals to the output data buffer to expect an incoming packet.

The data crossbar 108 connects multiple (group) inputs to multiple (group) outputs for transferring data packets. In one embodiment, the data crossbar 108 may have a "low" number of inputs and outputs relative to the number of ports 110, and may have a "wide" data width relative to an incoming data rate of the switch unit 100, i.e., a higher data rate relative to the data rate of the subports 110. For example, the data crossbar 108 may be a wide low port 34×34 crossbar having a 40 byte data width (i.e., 34×34@40 B), which reduces the number of internal wires by a factor of 16 compared to a conventional flat 136×136@10 B crossbar. The data crossbar 108 may provide an internal speed up relative to the incoming link data rate, for example, in one implementation; the internal speedup may be a factor of 1.45.

Figure 2:
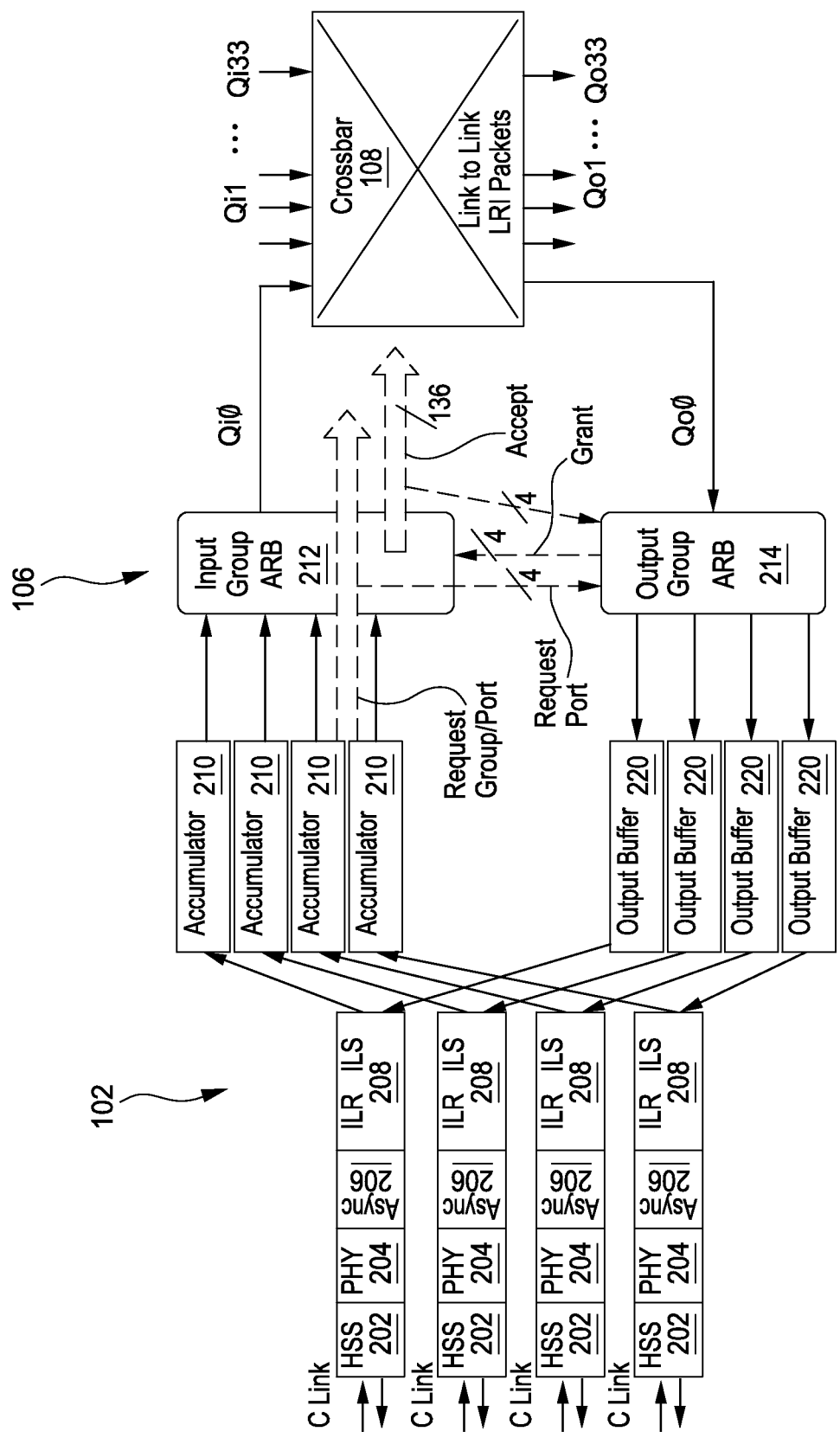
FIG. 2 is a block diagram depicting the switch unit of FIG. 1 in greater detail, according to embodiments of the present disclosure.

FIG. 2 is a block diagram depicting the switch unit 100 in greater detail, according to embodiments of the present disclosure. Each link layer and data buffering logic block 102 may include one or more high-speed serial (HSS) interfaces 202, physical layer interfaces 204, asynchronous blocks 206, integrated link protocol blocks 208 having integrated link send (ILS) and an integrated link receive (ILS) blocks, accumulators 210, and output buffers 220. While FIG. 2 depicts a link layer and data buffering logic block 102 for a particular quad (e.g., Quad0), it should be noted that the other link layer and data buffering logic blocks may be configured similarly.

In operation, packet data arriving off a link, depicted as a chassis link (CLink), at the HSS interface 202 at an incoming link data rate (e.g., 10B/cycle) is checked by the integrated link protocol block 208. As packets arrive on the link from the ILR 208, the packet data is forwarded to the accumulator 210 which acts as an input buffer that accumulates and buffers the packets. Depending on how busy output links of the data crossbar to which the buffered packets are to be sent to, the accumulator 210 may not win the arbitration process, and packets may start to accumulate in this input buffer. In some embodiments, the accumulator 210 may have a predefined packet depth, for example, is able to store up to 16 incoming packets (i.e., has a packet depth of 16). The accumulator 210 may buffer packets in the wide data width of the data crossbar 108, which is greater than the incoming link data rate. In some embodiments, the wide data width of the data crossbar may be predefined as a multiple, or other factor, of the incoming link data rate. For example, packets may arrive at 10 B/cycle, and the accumulator 210 may buffered packets in a wide data width of 40 B/cycle, i.e., the incoming data rate is one-fourth the bandwidth between the accumulator 210 and the data crossbar 108.

In one or more embodiments, the switch unit 100 may use an internal clock cycle for coordinating transfer of packets between ports of the switch unit. The internal clock cycle are conceptually organized in divisions of time, referred to herein as "timeslices" or cycle indexes. In some embodiments, the number of divisions of time may be determined based on the relationship between the wide data width of the data crossbar and the incoming link data rate, e.g., the number of timeslices in a supercycle may be based on the ratio of the data width of the crossbar to the incoming data rate of the input ports. In one implementation, each clock cycle may be organized into groups of four, yielding four timeslices, e.g., as "timeslice 0", "timeslice 1", "timeslice 2", and "timeslice 3", or designated by cycle indexes 0, 1, 2, and 3. In other words, if enumerated, the present clock cycle (e.g., "cc") mod 4 gives the index of the current timeslice. A cycle of all timeslices may be referred to as a "supercycle". A supercycle may begin with the start of each clock cycle "cc0" (i.e., cc0 mod 4=0), and ends with clock cycle "cc3" (i.e., cc3 mod 4=3).

The transfer of a packet from an input to an output occurs in steps, during consecutive timeslices of the same clock index. In order to transport a packet, p, a timeslice at clock index 0 must be allocated at which the corresponding crossbar input and output ports are idle, via the arbitration process. These crossbar ports become booked for all clock index 0 timeslices while the packet is being transferred; the remaining timeslices are however free, and may be assigned to transfer other packets from the same crossbar input (i.e., input quad), or to the same crossbar output (i.e., output quad) in parallel with the transfer of p. The crossbar ports of packet p may be able to allocate their clock index 0 timeslice to any other packet after the ports have finished transferring the packet p.

As shown in FIG. 2, the arbitration element 106 includes an input group arbiter 212 and an output group arbiter 214 for that quad is coupled between the accumulator 210 and the data crossbar 108. In one embodiment, the data crossbar 108 connects multiple input groups, identified as Qi0 to Qi33, to multiple output groups, identified Qo0 to Qo33, for transferring data packets. Each input group (e.g., Qi0) may be associated with a corresponding input group arbiter 212, and each output group (e.g., Qo0) may be associated with a corresponding output group arbiter 214. Once a packet wins arbitration (e.g., by operation of the input group arbiter 212), the data is passed through the data crossbar 108 at the wide data width (e.g., 40 B/cycle) at least once per supercycle, and then is converted back to the link data rate (e.g., 10 B/cycle) by the output buffers 220 over a plurality of clock cycles (e.g., 4 cycles). In one embodiment, the output data buffer 220 serializes the full wide data width of data (e.g., 40 B of data) received from the data crossbar 108 into a maximum data width of the incoming link data rate over all cycles of a supercycle (e.g., 10 B over the 4-cycle supercycle). The packet may then be passed to the output ILS 208 for transmission out of the switch unit 100.

Each incoming packet may be assigned a buffer location at the start of the packet. The buffer location and an output destination link are communicated to the arbitration element 106 at the start of the packet. The data buffering logic block 102 may also communicate to the arbitration element 106 when the packet has been fully received (i.e., the tail). In this manner, the arbitration element 106 may decide to allow the packet to participate in arbitration as soon as any valid header flits have arrived (i.e., a cut-through) or only after the packet has been fully buffered in the accumulator 210 (i.e., a store-and-forward).

As mentioned above, when a packet wins arbitration in the arbitration element 106, the arbitration element 106 signals the input data buffer to start transferring that packet with a start signal and a specified buffer location associated with the packet. In response to the start signal and buffer location from the arbitration element 106, the accumulator 210 reads the buffered flits from the array, and passes the flits to the crossbar. In one embodiment, the clock cycle on which the start signal arrives determines which cycle index (i.e., timeslice) of the supercycle is utilized for the packet's data transfer. The designated cycle index may be occupied at both the accumulator 210 and the output data buffers 220, until the accumulator 210 signals the final packet flits have been transmitted. It should be noted that the same cycle index can be simultaneously utilized by outer input/output pairs.

In the case that the incoming packet has been fully received before the packet has won arbitration, each transfer through the crossbar (recall: one transfer per supercycle) may contain a full wide data width of data (e.g., 40 B) until the final transfer. In the case that the packet is still arriving when the packet wins arbitration, the transfer through the data crossbar 108 may occur at the full wide data width (e.g., 40 B/cycle) for any buffered data, and when the buffered data is exhausted, the remaining data is transferred at the incoming link data rate.

Figure 3:
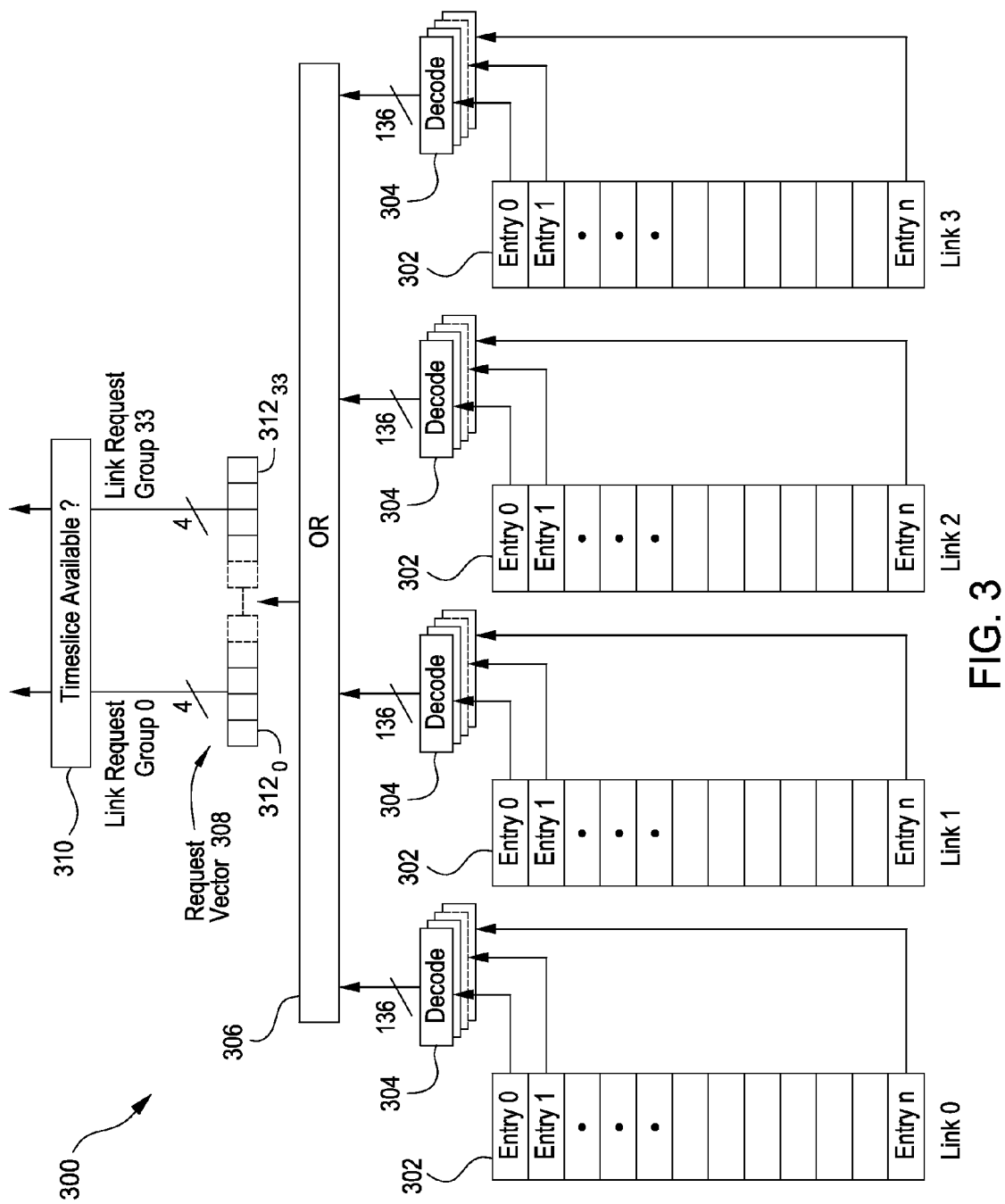
FIG. 3 is a block diagram depicting a technique for request formation performed by an input group arbiter as part of an arbitration operation for a corresponding quad, according to embodiments of the present disclosure.

FIG. 3 is a block diagram depicting a technique 300 for request formation performed by an input group arbiter 212 as part of an arbitration operation for a corresponding quad, according to embodiments of the present disclosure. Each input group arbiter 212 may manage requests for packet transfers from the corresponding group of (e.g., four) links through the use of a link queue 302. As shown in FIG. 3, the input group arbiter for a group may use a link queue 302 corresponding to each link in that group, identified as "link 0", "link 1", "link 2", "link 3." A link queue 302 includes a plurality of entries, entry 0 to entry n, corresponding to packets buffered in the accumulator 210. Each entry in the link queue 302 may specify a destination port of the corresponding buffered packet, and represents a request to transfer data through the data crossbar to that destination port.

In operation, decode blocks 304 performs a decode of the specified destination port for every valid entry (e.g., entry 0, entry 1, etc.) in the link queue 302 and generates a per-link request vector having a width equal to the number of possible destination ports. These requests are unified together, for example, by a logical OR block 306, and latched to meet timing, thereby forming a request vector 308, with each bit of the request vector corresponding to a particular output link of the switch unit 100. The request vector 308 may be broken into link request sub-vectors 312 associated with the output groups 112, where each bit in a sub-vector corresponds to a specific output subport in that output group. As such, the request vector 308 consolidates requests from the input subports. The input group arbiter 212 sends the sub-vectors to the respective output group arbiters 214 for grant processing, as described in greater detail in conjunction with FIG. 4.

In the implementation depicted in FIG. 3, each link queue 302 may contain 16 entries, corresponding to the accumulator's packet depth of 16, and has a choice of 136 possible destination ports. The decode performed on entries of the link queues 302 results in 4*(n+1) vectors having a width equal to the number of possible destination ports. The unifying operation (e.g., 306) generates a 136-bit request vector 308, which is broken into 34 (output quad) 4-bit sub-vectors (e.g., $312_0$ to $312_{33}$), and each bit in the 4-bit sub-vector corresponds to a specific output subport in that output quad.

In some embodiments, by execution of a logic block 310, each input arbiter may also track the timeslices, or cycle index, when that input's data buffer is transferring data to the data crossbar 108. When a timeslice is already busy, the request vector may be suppressed by a logic block 310 to avoid an output arbiter 214 from issuing a wasted grant, i.e., a grant that would not be accepted because the timeslice was busy.

Figure 4:
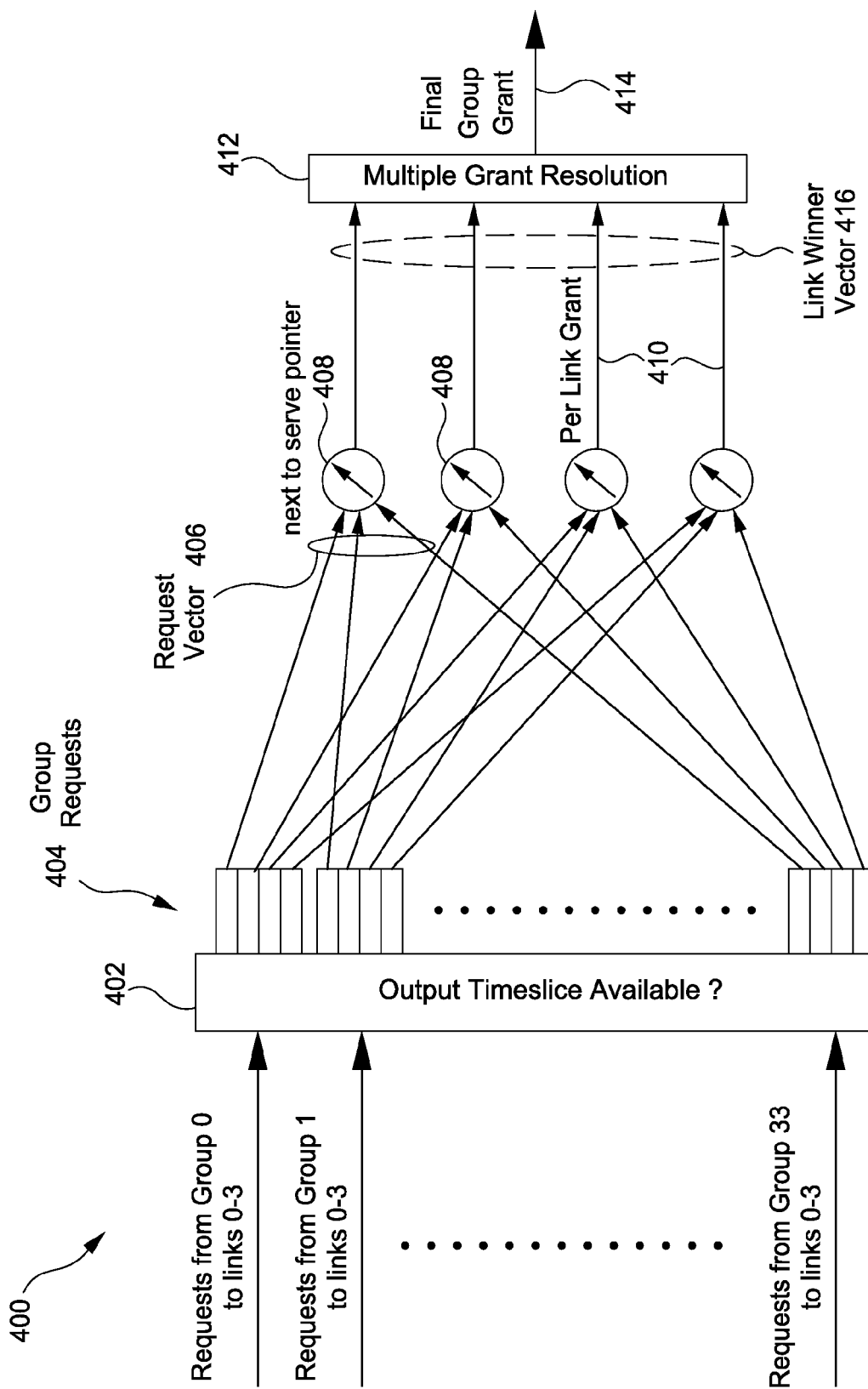
FIG. 4 is a block diagram depicting a technique for grant processing performed by an output group arbiter as part of an arbitration operation for a corresponding quad, according to embodiments of the present disclosure.

FIG. 4 is a block diagram depicting a technique 400 for grant processing performed by an output group arbiter 214 as part of an arbitration operation for a corresponding quad, according to embodiments of the present disclosure. As shown in FIG. 4, the output group arbiter may include a grant logic block 402, a plurality of next-to-serve pointers 408, and a multiple grant resolution logic block 412. At the output group arbiter 214, the incoming sub-vectors 404 from all the input group arbiters 212 are re-organized and converted into a request vector 406 per output link.

For example, in one implementation, the output group arbiter 214 corresponding to the output group having output links 0-3, receives 4-bit sub-vectors from the input group arbiters 212 representing unified requests from groups of input links to transfer data to the output links 0-3. As shown, the output group arbiter receives a first 4-bit link request from Group 0 to links 0-3, a second 4-bit link request from Group 1 to links 0-3, and so forth, and a last 4-bit link request from Group 33 to links 0-3. These incoming 4-bit requests are converted into a 34-bit request vector per output link. In other words, all first bits, which are associated with output link 0, are taken from (all thirty-four) 4-bit requests to form a first 34-bit request vector associated with output link 0; all second bits, which are associated with the output link 1, are taken from the 4-bit request to form a second 34-bit request vector associated with output link 1, and so forth.

In one embodiment, the grant logic block 402 is configured to determine, for each output link, if the output link can grant an incoming request according to whether any of a plurality of conditions are met. In some embodiments, the conditions may include that: (1) an output subport cannot issue a grant if the output subport has no credits; (2) an output subport cannot issue a grant if the output subport is busy in any clock cycle in a supercycle; (3) an output subport cannot issue a grant if the associated output quad is busy in the corresponding transfer clock cycle; and (4) an output subport cannot issue a grant to a different input arbiter if the output subport issued a grant the previous cycle.

The plurality of next-to-serve pointers 408 are associated with the output subports, for example, one next-to-serve pointer 408 for each output subport. A next-to-serve pointer 408 associated with an output subport is configured to retrieve request for the (34-bit) output link request vector associated with that output subport. In operation, starting from the next-to-serve pointer 408, each output link may look at its incoming 34-bit request vector, choose a next request to serve, and issue a per-link grant 410 to some input link. If any of the (above-mentioned) conditions are met by an output link, the logic block 402 may instead suppress any grants 410 for that output link.

When multiple output links are able to issue a grant, the multiple grant resolution logic block 412 is configured to execute a resolution algorithm that determines which per-link grant 410 shall become a final group grant 414 issued. The per-link grants 410 may form a link winner vector 416 which indicates that one or more of the output links may issue a grant. In one implementation, each bit of the link winner vector 416 corresponds to one of the output links and indicates the corresponding output link can satisfy the arbitration slot and issue a grant.

According to embodiments of the present disclosure, the multiple grant resolution logic block 412 is configured to implement a scheduling scheme in which a least recently used (output) link is given a highest priority to issue the final group grant 414. The multiple grant resolution logic block 412 may maintain an ordered queue of link selections for the output group. Whenever an output link of the group is selected as the final group grant 414 (in both multiple-grant and single-grant cases), the queue entry representing that output link is placed at the bottom of the queue, allowing the least recently chosen link to bubble up to the top. In the event multiple output links could be chosen (i.e., multiple-grant case), the grant resolution logic block 412 is configured to select the oldest output link matching the link winner vector 416 and issue a final group grant 414 for that output link. An example algorithm that may be used by grant resolution logic block 412 is described in greater detail later.

When a per-link grant 410 is the winner of the multiple grant resolution (e.g., at 412), the output group arbiter 214 may update the next-to-serve pointer 408 associated with the winning output link. In one implementation, the output group arbiter allows a configurable policy of advancing the next-to-serve pointer 408 when issuing a grant, or, in other cases, only advances the next-to-serve pointer 408 when the grant is accepted (by an input arbiter). The output group arbiter 214 generates the final group grant 414 that designates a particular input quad has been issued a grant and that specifies which output subport in the output quad have issued the grant. The final group grant 414 may be combined with the final group grants generated by other output group arbiters acting in parallel, to form a final group grant vector. In one implementation, the output group arbiter 214 generates a O-bit final grant 414 and sends the final group grant 414 to each input arbiter for accept processing, as described in greater detail in conjunction with FIG. 5.

Figure 5:
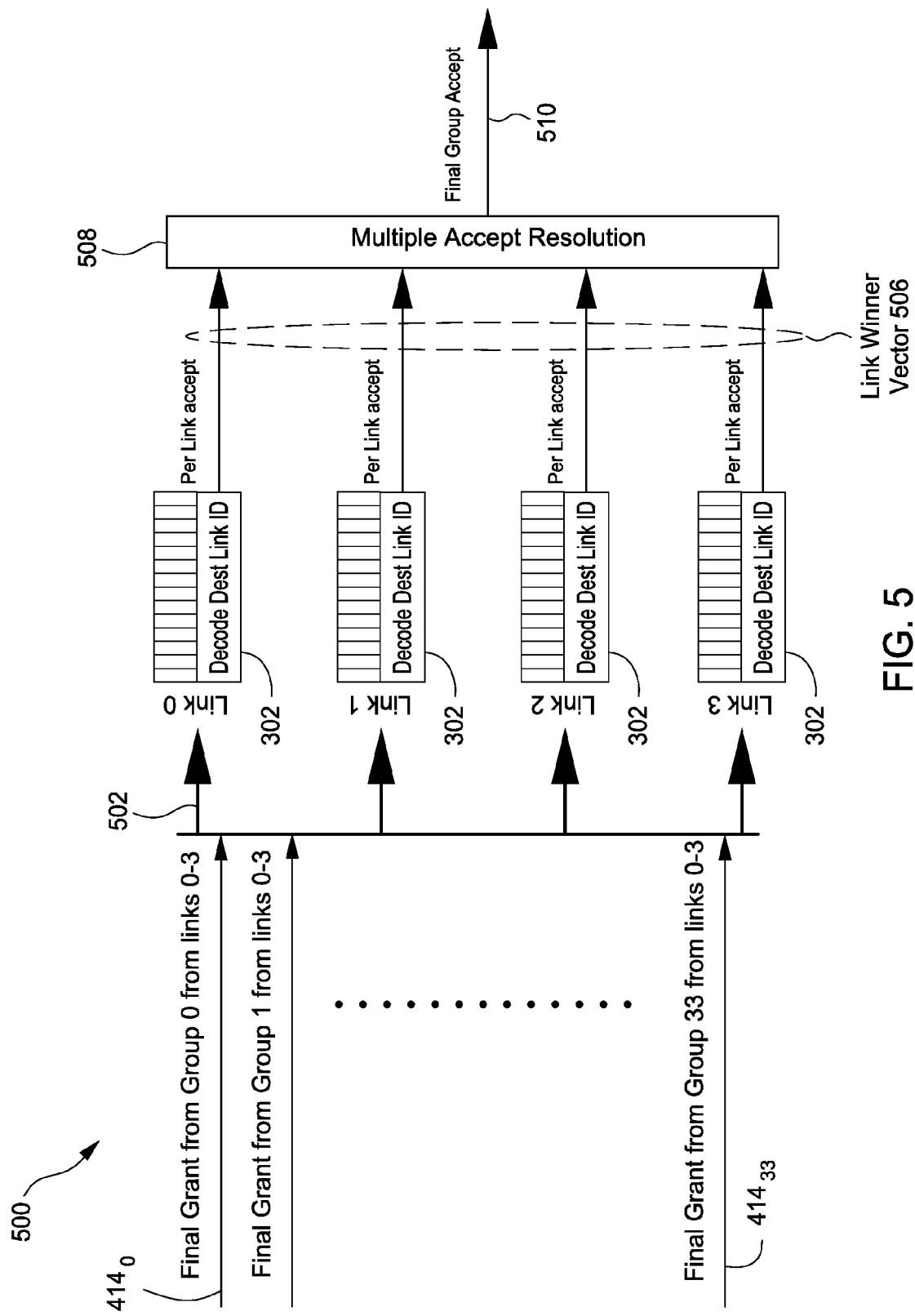
FIG. 5 is a block diagram depicting a technique for accept processing performed by an input group arbiter as part of an arbitration operation for a corresponding quad, according to embodiments of the present disclosure.

FIG. 5 is a block diagram depicting a technique 500 for accept processing performed by an input group arbiter 212 as part of an arbitration operation for a corresponding quad, according to embodiments of the present disclosure. As shown in FIG. 5, at each clock cycle, the input group arbiter receives a final group grant 414 (e.g., 4-bit final grant) from each output quad, which indicates which output quads (and for which specific output subport) have issued a grant to this input quad. In some embodiments, the input arbiter may receive 1 grant per output quad. For example, in one implementation, the input group arbiter 212 corresponding to an input quad, receives a 4-bit final grant from the output Group 0 from links 0-3, a second 4-bit final grant from Group 1 from links 0-3, and so forth, and a last 4-bit link request from Group 33 from links 0-3.

At 502, the input arbiter re-orders these final group grants 414 to match the original request vectors 308 formed during the request formation in FIG. 3. For example, the 34 4-bit final group grants 414 received from the output quads are reordered into one 136-bit grant vector, where each bit of the 136-bit grant vector maps corresponds to an output subport and indicates whether that output subport has issued a grant to this input quad.

As depicted in FIG. 5, the input arbiter performs a search, starting from the oldest entry in each link queue 302, to find the oldest entry that matches the incoming grant vector, and issues a per-link accept 504. If multiple input links are capable of accepting a grant, a multiple accept resolution logic block 508 of the input arbiter may execute a resolution algorithm that determines which per-link accept 504 shall become the final group accept. In one embodiment, similar to the per-link grants 410 described above, the per-link accepts 504 may form a link winner vector 506 which indicates that one or more of the input links may accept a grant. In one implementation, each bit of the link winner vector 506 corresponds to one of the input links and indicates the corresponding input link can satisfy the arbitration slot and accept the grant. When a packet has been accepted, the input arbiter signals to various components within the switch unit 100 to begin the transfer.

In one or more embodiments, the multiple accept resolution logic block 508 may utilize a resolution algorithm in which a least recently used (input) link indicated by the link winner vector 506 is given a highest priority to issue the final group accept, similar to the scheme used by the multiple grant resolution logic block 412 described earlier.

The multiple accept resolution logic block 508 may maintain an ordered queue of link selections for the input group. Whenever an input link of the group is selected as the final group accept (in both multiple-accept and single-accept cases), the queue entry representing that input link is placed at the bottom of the queue, allowing the least recently chosen link to bubble up to the top. In the event multiple input links could be chosen (i.e., multiple-accept case), the accept resolution logic block 508 is configured to select the oldest input link matching the link winner vector 416 and issue a final group accept for that input link. An example algorithm that may be used by resolution logic blocks 412 and 508 is described in conjunction with FIG. 6. An example hardware implementation of resolution logic blocks 412 and 508 is described in conjunction with FIGS. 7A and 7B.

Figure 6:
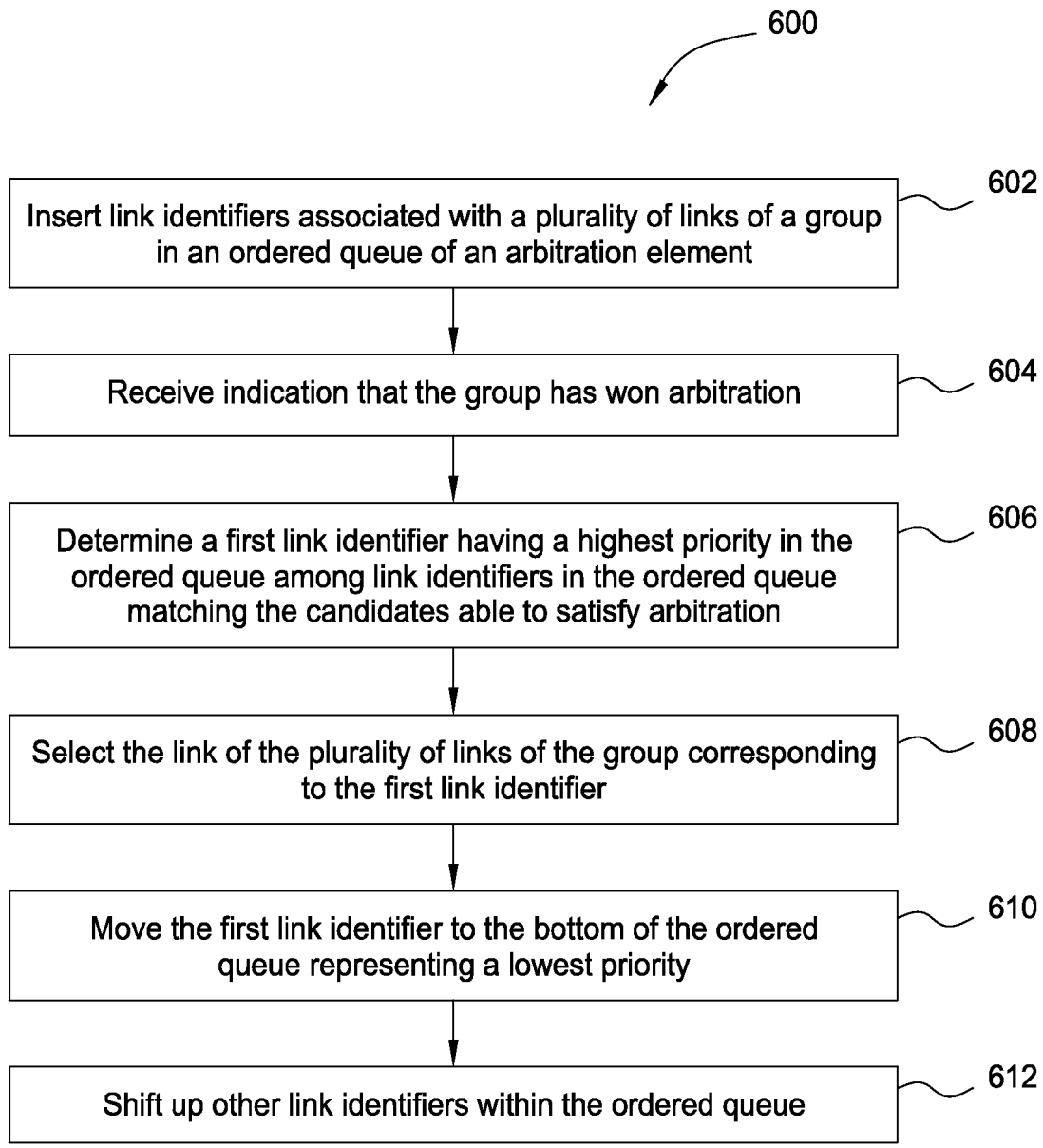
FIG. 6 is a flow diagram depicting a method for implementing a scheduling scheme for crossbar scheduler in a switch unit, according to one embodiment of the present disclosure.

FIG. 6 is a flow diagram depicting a method 600 for implementing a scheduling scheme for crossbar scheduler in a switch unit, according to one embodiment of the present disclosure. While the method 600 is described as being performed by an output group arbiter 214 during a grant phase of the arbitration operation for sake of example, it is noted that the method 600 may also be performed by an input group arbiter 212 during an accept phase of the arbitration operation.

At step 602, at initialization time, the output arbiter 214 inserts link identifiers associated with the plurality of links of a group in an ordered queue. For example, the output arbiter 214 for a given output quad may insert link identifiers corresponding to links 0-3 of the output quad into the ordered queue. The head of the ordered queue represents a highest priority for being selected, and the tail of the ordered queue represents a lowest priority for being selected. In some embodiments, the initial order of the link identifiers within the ordered queue may be set to a predetermined order, or may be any permutation of link identifiers.

At step 604, the output arbiter 214 receives an indication that the output group has won an arbitration slot. Responsive to receiving the notification that the output group has won arbitration, the output arbiter 214 may determine which of the output links are candidates that are able to satisfy the arbitration slot. In some cases, the output arbiter may determine that multiple output links of the output group can satisfy the arbitration slot.

At step 606, the output arbiter 214 determines a first link identifier having a highest priority within the ordered queue among other link identifiers in the ordered queue matching the candidates able to satisfy the arbitration slot. In some embodiments, the output arbiter 214 performs a search in the ordered queue, matching the possible winning links to the link identifiers in the ordered queue. The link identifier having highest priority and that matches takes precedence.

At step 608, the output arbiter 214 selects the output link of the plurality of links of the group corresponding to the first link identifier to satisfy the arbitration slot. Upon selecting the link corresponding to the first matching link identifier, the output arbiter 214 updates the ordered queue based on the selected first link.

In one embodiment, at step 610, the output arbiter 214 moves the first link identifier to the bottom of the ordered queue (representing a lowest priority). In some embodiments, at step 612, the output arbiter 214 shifts up one or more other link identifiers within the ordered queue. In some cases, not all of the link identifiers are shifted up within the ordered queue. For example, there may be link identifiers having a higher priority within the ordered queue, but do not match the candidates able to satisfy the arbitration slot. In some embodiments, the position of such unmatched link identifiers are maintained within the ordered queue, rather than reset and moved to the bottom, such that the unmatched link identifiers maintain the associated high level of priority for servicing arbitration slots in subsequent clock cycles.

It is noted that the output arbiter 214 may update the ordered queue based on any link selected in the single-grant case as well. For example, the output arbiter 214 may receive a second indication that the group has won an arbitration slot, wherein only a second link of the group is able to satisfy the arbitration slot. The output arbiter 214 selects the second link of the group to satisfy the arbitration slot, and updates the ordered queue based on the selected second link by moving the second link identifier corresponding to the second link to the bottom of the ordered queue.

Figure 7A:
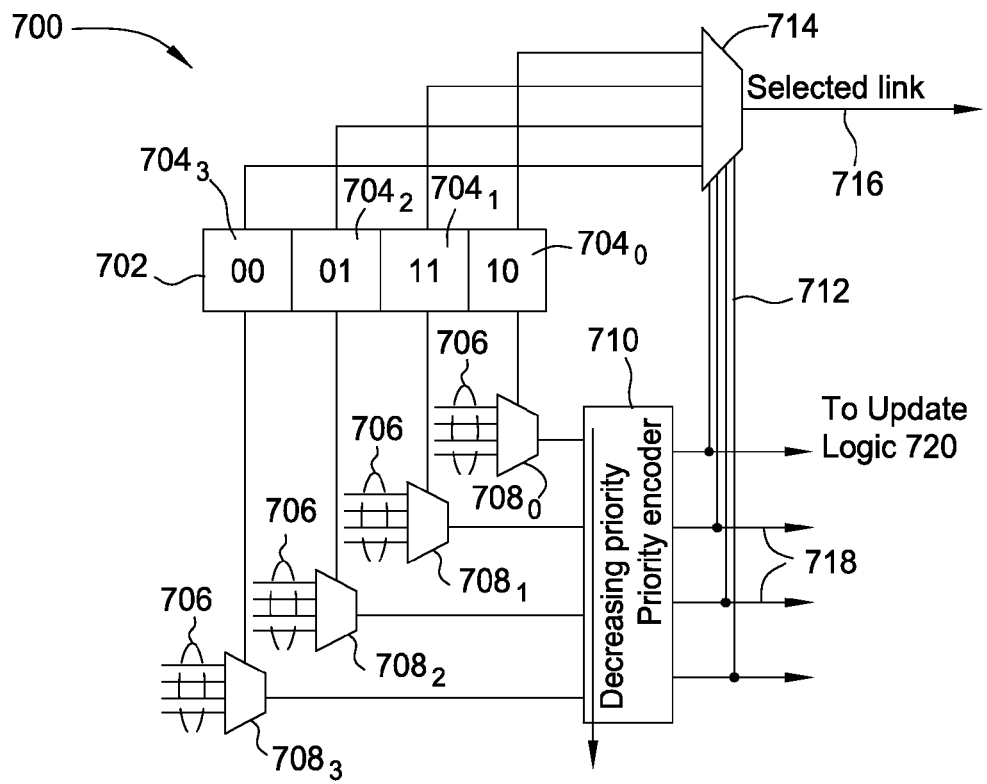
FIGS. 7A and 7B illustrates a hardware representation of select link logic and update logic that implement an oldest link first scheduling scheme for a switch unit, according to one embodiment of the present disclosure.
Figure 7B:
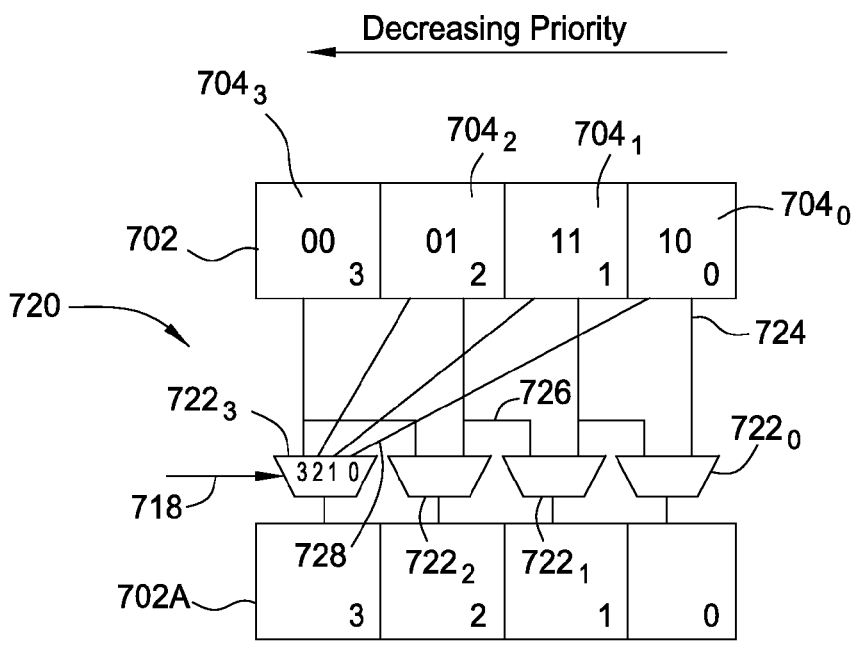

FIGS. 7A and 7B illustrate hardware representations of select link logic 700 and update logic 720, respectively, that implement an oldest-link-first scheduling scheme for a switch unit, according to one embodiment of the present disclosure. While the select link logic 700 and update logic 720 is described as being part of the multiple grant resolution logic block 412 of an output arbiter 214 for clarity of explanation, it is noted that the select link logic 700 and update logic 720 may also be part of the multiple accept resolution logic block 508 of an input arbiter 212. It is further noted that embodiments of the present disclosure are not limited to the specific circuit elements depicted in FIGS. 7A and 7B, and that any circuit elements that are functionally equivalent, alone or in combination, to the depicted elements, including logic gates, adders, latches, flip-flops, counters, and registers, may be used.

In at least one embodiment, the select link logic 700 includes an ordered queue 702 having a plurality of entries (e.g., $704_0$, $704_1$, $704_2$, $704_3$) associated with the plurality of links in a group. In one implementation, the ordered queue 702 is shift register having entries corresponding to the number of links in the output group. The entries of the ordered queue 702 may be associated with a decreasing level of priority, such that the head of the queue, i.e., entry $704_0$, has a highest level of priority and entry $704_3$ has the lowest. Each entry 704 of the ordered queue contains a link identifier that represents an output link's place within the queue. In the example shown in FIG. 7A, the first entry $704_0$ contains the bit value 0b10 representing the output link 2; the second entry $704_1$ contains the bit value 0b11 representing the output link 3; the third entry $704_2$ contains the bit value 0b01 representing the output link 1; and the fourth entry $704_3$ contains the bit value 0b00 representing the output link 0. In this example, the output link 2 currently has the highest priority within the output quad, and the output link 0 has the lowest priority among the quad. The select link logic 700 may be configured to, at initialization time, insert the link identifiers into the ordered queue 702 in a pre-determined order, or in an arbitrary order. The ordered queue 702 may be updated by update logic 720 described later in conjunction with FIG. 7B.

As shown in FIG. 7A, the select link logic 700 uses a link winner vector 706 (e.g., link winner vector 416 shown in FIG. 4) as input indicating which of the output links of the output quad can satisfy the arbitration slot. In one implementation, each bit of the link winner vector 706 corresponds to an output link and indicates whether the corresponding output link can satisfy the arbitration slot and can issue a grant (i.e., linkWinnerVector=<link0HasWinner, link1HasWinner, link2HasWinner, link3HasWinner>). In some scenarios (i.e., the single-grant case), only one bit of the link winner vector 706 is set to 1, indicating that only a single output link of the output quad can claim the arbitration slot. In other scenarios (i.e., the multiple-grant case), multiple bits of the link winner vector 706 are set to 1, indicating that multiple output links of the output quad can satisfy the arbitration slot. In another scenario, all of the bits of the link winner vector 706 are set to zero, indicating none of the output links can satisfy the arbitration slot.

In one or more embodiments, the select link logic 700 includes a plurality of multiplexors 708 (e.g., $708_0$ to $708_3$) configured to match indications from the link winner vector 706 with link identifiers in the ordered queue 702. The multiplexors 708 acts as decoders of the link winner vector 706 based on encodes (i.e., link identifiers) in the ordered queue. In one implementation, a first multiplexor $708_0$ is connected to the first queue entry $704_0$ (i.e., head of the queue 702), a second multiplexer $708_1$ is connected to the second queue entry $704_1$, and so forth. Each multiplexor 708 receives the link winner vector 706 as data input and uses the link identifier contained in entries 704 of the ordered queue 702 as selection input to multiplex out from the link winner vector 706 an indication that the output link corresponding to the link identifier can satisfy the arbitration slot. As such, a multiplexor 708 would output a high (1) bit only if a link identifier multiplexes out a high (1) bit from the link winner vector 706, thereby providing a matched indication that the link corresponding to a link identifier can satisfy the arbitration slot. For example, the first multiplexor $708_0$ connected to the first queue entry $704_0$ (i.e., head of the queue 702) uses the link identifier value of "2" (0b10) representing output link 2 as selection input to select the third bit from the link winner vector 706 (i.e., <link2HasWinner>). Because each multiplexor is connected to a particular entry in the ordered queue, the matched indications are output from the multiplexors $708_0$ to $708_3$, respectively, in an order reflecting the (decreasing) priority of the links within the ordered queue 702.

As shown in FIG. 7, the matched indications output from the multiplexors $708_0$ to $708_3$ are provided to a priority encoder 710 in decreasing priority order. For example, the output from multiplexor $708_0$ (associated with the entry $704_0$ at the head of the ordered queue) is provided as a highest-priority input, and the output from multiplexor 7083 (associated with the entry $704_3$ at the bottom of the ordered queue) is provided as a lowest-priority input. The priority encoder 710 is configured to output an index 712, i.e., "place", of the selected output link having the highest priority. If multiple matched indications from the multiplexors $708_0$ to $708_3$ are given to the priority encoder 710 at the same time (i.e., the multiple-grant case), the matched indication having the highest priority takes precedence and the other matched indications are ignored. For example, the priority encoder 710 would select the link identifier from queue entry $704_0$ if the output of the link winner vector 706 for queue entry $704_0$ were a high (1) bit. Otherwise, the priority encoder 710 would select the link identifier from queue entry $704_1$ if the output of the link winner vector 706 for queue entry $704_1$ were a high (1) bit, and so forth. In some embodiments, the index 712 from the priority encoder may be one-hot encoded, i.e., has a value where only one bit is high (1) and all others are low (0). It is noted that if the index 712 has a value where all hits are low (0), no output link issues a grant.

The select link logic 700 includes a multiplexor 714 configured to select the output link from the output quad corresponding to the matched link identifier having the highest priority. As shown in FIG. 7, the multiplexor 714 receives the index 712 as a selection input to select an entry 704 from the ordered queue 702 and read the link identifier out of the selected entry 704. The multiplexor 714 outputs the selected link identifier 716, which may be used as a final group grant (e.g., 414) described earlier.

In one example operation, say the select link logic 700 received a link winner vector 706 containing the value 0b0110, which indicate output links 1 and 2 can satisfy the arbitration slot and issue a grant. As the queue entry $704_0$ connected to the first multiplexor $708_0$ contains link identifier 0b10 representing output link 2, the select link logic 700 determines output link 2 has a winner by multiplexing out that high (1) bit from the link winner vector 706 (by the first multiplexor $708_0$), and performs a priority encode of that bit. As the queue entry $704_1$ connected to the second multiplexor $708_1$ contains the link identifier 0b11 representing output link 3, the select link logic 700 determines output link 3 does not have a winner by multiplexing out that low (0) bit from the link winner vector 706, and performs a priority encode of that bit. Similarly, the select link logic 700 determines output link 1 has a winner by multiplexing out that high (1) bit from the link winner vector 706 (by the third multiplexor $708_2$ connected to the queue entry $704_2$), determines output link 3 does not have a winner by multiplexing out the low (0) bit from the link winner vector (by the fourth multiplexor $708_3$ connected to the queue entry $704_3$), performs a priority encode of all those bits. In this example, the priority encoder 710 chooses the matched indication for output link 2 over the matched indication for output link 1 due to the higher-priority level of the matched indication from first multiplexor $708_0$.

In one or more embodiments, update logic 720 is configured to update the ordered queue 702 based on the results from the priority encoder 710 to move the selected link identifier to the bottom entry of the queue and shift up the other link identifiers to higher entries in the queue. In some embodiments, a logic block (not shown) may generate one or more control signals 718 for the update logic 720 based on the output from the priority encoder 710.

As shown in FIG. 7B, the update logic 720 includes a plurality of multiplexors 722 (e.g., $722_0$ to $722_3$) connected to the entries 704 of the ordered queue 702. For clarity of illustration, FIG. 7B depicts the ordered queue 702 at a given point in time, and at some subsequent point in time (e.g., next cycle), as queue 702A. As such, while multiplexors 722 are depicted reading values from the entries of queue 702 and writing to entries of queue 702A, it is understood that multiplexors 722 may be reading and writing to the same queue, in a self-referential manner.

In one embodiment, the control signals 718 may instruct the multiplexors 722 to move a link identifier to the bottom of queue 702A at a last entry (i.e., entry 3), to shift link identifiers to other entries in queue 702A, and to maintain a link identifier within the same entry for a next cycle of operation. For example, if the priority encoder 710 had selected the second queue entry $704_1$, the control signals 718 instruct the first multiplexor $722_0$ to select a top input 724 (i.e., "TOP") to maintain the same link identifier within queue entry $704_0$ of queue 702A. It is noted that in this case, the link identifier in the first queue entry keeps its high priority spot in the ordered queue even though the link did not win arbitration for whatever reason during this cycle. This behavior stands in contrast to conventional round-robin resolution algorithms, in which the link would forfeit its opportunity at higher priority.

Continuing the example above, the control signals 718 instruct the multiplexors $722_1$ and $722_2$ to select a left input 726 (i.e., "LEFT") to shift the link identifier from entry $704_2$ to entry $704_1$, and the link identifier from entry $704_3$ to entry $704_2$ of queue 702A, respectively. The control signals 718 instruct the multiplexor $722_3$ to select input 728 (i.e., "0") to move the link identifier from the second queue entry $704_0$ to the last entry $704_3$, i.e., the bottom of the queue 702A. Table 1 summarizes control signals 718 operations for multiplexors $722_0$ to $722_3$ (identified as Mux0 to Mux3, respectively) generated in response to selection of a given queue entry by the priority encoder 710.

TABLE 1

Update Logic Control Signals

| Queue Selection | MUX3 | MUX2 | MUX1 | MUX0 |
|---|---|---|---|---|
| Entry 0 | 0 | LEFT | LEFT | LEFT |
| Entry 1 | 1 | LEFT | LEFT | TOP |
| Entry 2 | 2 | LEFT | TOP | TOP |
| Entry 3 | 3 | TOP | TOP | TOP |
| No Entry | TOP | TOP | TOP | TOP |

Example Distributed Network Switch

Figure 8:
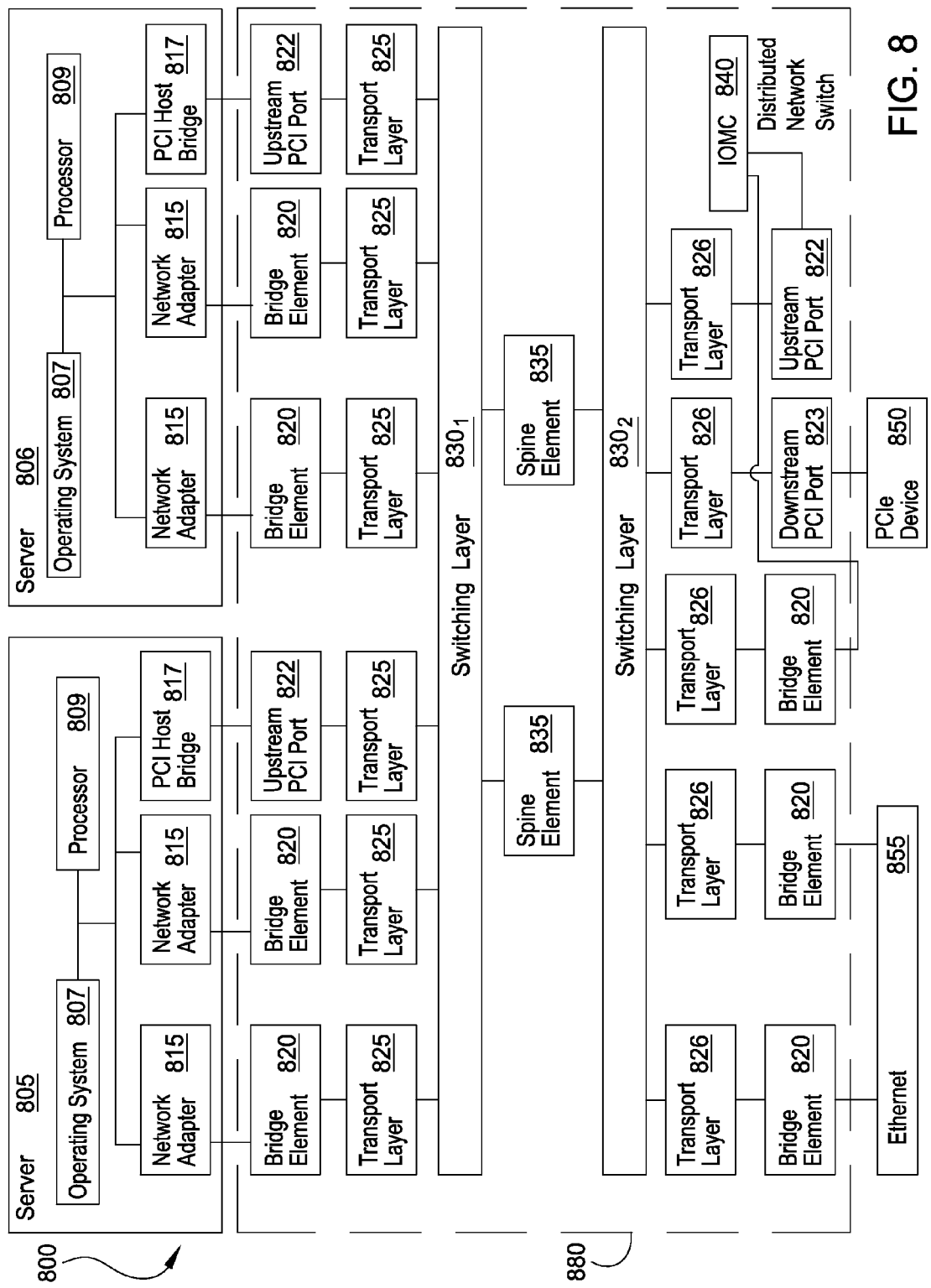
FIG. 8 illustrates a system architecture that includes a distributed virtual switch, according to one embodiment described herein.

FIG. 8 illustrates a system architecture 800 that includes a distributed network switch 880, according to one embodiment described herein. The first server 805 may include at least one processor 809 coupled to a memory (not pictured). The processor 809 may represent one or more processors (e.g., microprocessors) or multi-core processors. The memory may represent random access memory (RAM) devices comprising the main storage of the server 805, as well as supplemental levels of memory, e.g., cache memories, non-volatile or backup memories (e.g., programmable or flash memories), read-only memories, and the like. In addition, the memory may be considered to include memory storage physically located in the server 805 or on another computing device coupled to the server 805.

The server 805 may operate under the control of an operating system 807 and may execute various computer software applications, components, programs, objects, modules, and data structures, such as virtual machines (not pictured).

The server 805 may include network adapters 815 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 800 may include a multi-root I/O virtualization (MR-IOV) adapter. The network adapters 815 may further be used to implement of Fiber Channel over Ethernet (FCoE) protocol, RDMA over Ethernet, Internet small computer system interface (iSCSI), and the like. In general, a network adapter 815 transfers data using an Ethernet or PCI based communication method and may be coupled to one or more of the virtual machines. Additionally, the adapters may facilitate shared access between the virtual machines. While the adapters 815 are shown as being included within the server 805, in other embodiments, the adapters may be physically distinct devices that are separate from the server 805.

In one embodiment, each network adapter 815 may include a converged adapter virtual bridge (not shown) that facilitates data transfer between the adapters 815 by coordinating access to the virtual machines (not pictured). Each converged adapter virtual bridge may recognize data flowing within its domain (i.e., addressable space). A recognized domain address may be routed directly without transmitting the data outside of the domain of the particular converged adapter virtual bridge.

Each network adapter 815 may include one or more Ethernet ports that couple to one of the bridge elements 820. Additionally, to facilitate PCIe communication, the server may have a PCI Host Bridge 817. The PCI Host Bridge 817 would then connect to an upstream PCI port 822 on a switch element in the distributed switch 880. The data is then routed via a first switching layer $830_1$ to one or more spine elements 835. The spine elements 835 contain the hierarchical crossbar schedulers (not shown), which perform the arbitration operations described above. The data is then routed from the spine elements 835 via the second switching layer $830_2$ to the correct downstream PCI port 823 which may be located on the same or different switch module as the upstream PCI port 822. The data may then be forwarded to the PCI device 850. While the switching layers $830_{1-2}$ are depicted as separate, they logically represent different passes through the same switching layer 830, before and after being routed through one of the spine elements 835.

The bridge elements 820 may be configured to forward data frames throughout the distributed network switch 880. For example, a network adapter 815 and bridge element 820 may be connected using two 40 Gbit Ethernet connections or one 100 Gbit Ethernet connection. The bridge elements 820 forward the data frames received by the network adapter 815 to the first switching layer $830_1$, which is then routed through a spine element 835, and through the second switching layer $830_2$. The bridge elements 820 may include a lookup table that stores address data used to forward the received data frames. For example, the bridge elements 820 may compare address data associated with a received data frame to the address data stored within the lookup table. Thus, the network adapters 815 do not need to know the network topology of the distributed switch 880.

The distributed network switch 880, in general, includes a plurality of bridge elements 820 that may be located on a plurality of a separate, though interconnected, hardware components. To the perspective of the network adapters 815, the switch 880 acts like one single switch even though the switch 880 may be composed of multiple switches that are physically located on different components. Distributing the switch 880 provides redundancy in case of failure.

Each of the bridge elements 820 may be connected to one or more transport layer modules 825 that translate received data frames to the protocol used by the switching layers $830_{1-2}$. For example, the transport layer modules 825 may translate data received using either an Ethernet or PCI communication method to a generic data type (i.e., a cell) that is transmitted via the switching layers $830_{1-2}$ (i.e., a cell fabric). Thus, the switch modules comprising the switch 880 are compatible with at least two different communication protocols—e.g., the Ethernet and PCIe communication standards. That is, at least one switch module has the necessary logic to transfer different types of data on the same switching layers $830_{1-2}$.

Although not shown in FIG. 8, in one embodiment, the switching layers $830_{1-2}$ may comprise a local rack interconnect with dedicated connections which connect bridge elements 820 located within the same chassis and rack, as well as links for connecting to bridge elements 820 in other chassis and racks.

After the spine element 835 routes the cells, the switching layer $830_2$ may communicate with transport layer modules 826 that translate the cells back to data frames that correspond to their respective communication protocols. A portion of the bridge elements 820 may facilitate communication with an Ethernet network 855 which provides access to a LAN or WAN (e.g., the Internet). Moreover, PCI data may be routed to a downstream PCI port 823 that connects to a PCIe device 850. The PCIe device 850 may be a passive backplane interconnect, as an expansion card interface for add-in boards, or common storage that can be accessed by any of the servers connected to the switch 880.

Although "upstream" and "downstream" are used to describe the PCI ports, this is only used to illustrate one possible data flow. For example, the downstream PCI port 823 may in one embodiment transmit data from the connected to the PCIe device 850 to the upstream PCI port 822. Thus, the PCI ports 822, 823 may both transmit as well as receive data.

A second server 806 may include a processor 809 connected to an operating system 807 and memory (not pictured) which includes one or more virtual machines similar to those found in the first server 805. The memory of server 806 also includes a hypervisor (not pictured) with a virtual bridge (not pictured). The hypervisor manages data shared between different virtual machines. Specifically, the virtual bridge allows direct communication between connected virtual machines rather than requiring the virtual machines to use the bridge elements 820 or switching layers $830_{1-2}$ to transmit data to other virtual machines communicatively coupled to the hypervisor.

An Input/Output Management Controller (IOMC) 840 (i.e., a special-purpose processor) is coupled to at least one bridge element 820 or upstream PCI port 822 which provides the IOMC 840 with access to the second switching layer $830_2$. One function of the IOMC 840 may be to receive commands from an administrator to configure the different hardware elements of the distributed network switch 880. In one embodiment, these commands may be received from a separate switching network from the second switching layer $830_2$.

Although one IOMC 840 is shown, the system 800 may include a plurality of IOMCs 840. In one embodiment, these IOMCs 840 may be arranged in a hierarchy such that one IOMC 840 is chosen as a master while the others are delegated as members (or slaves).

Figure 9:
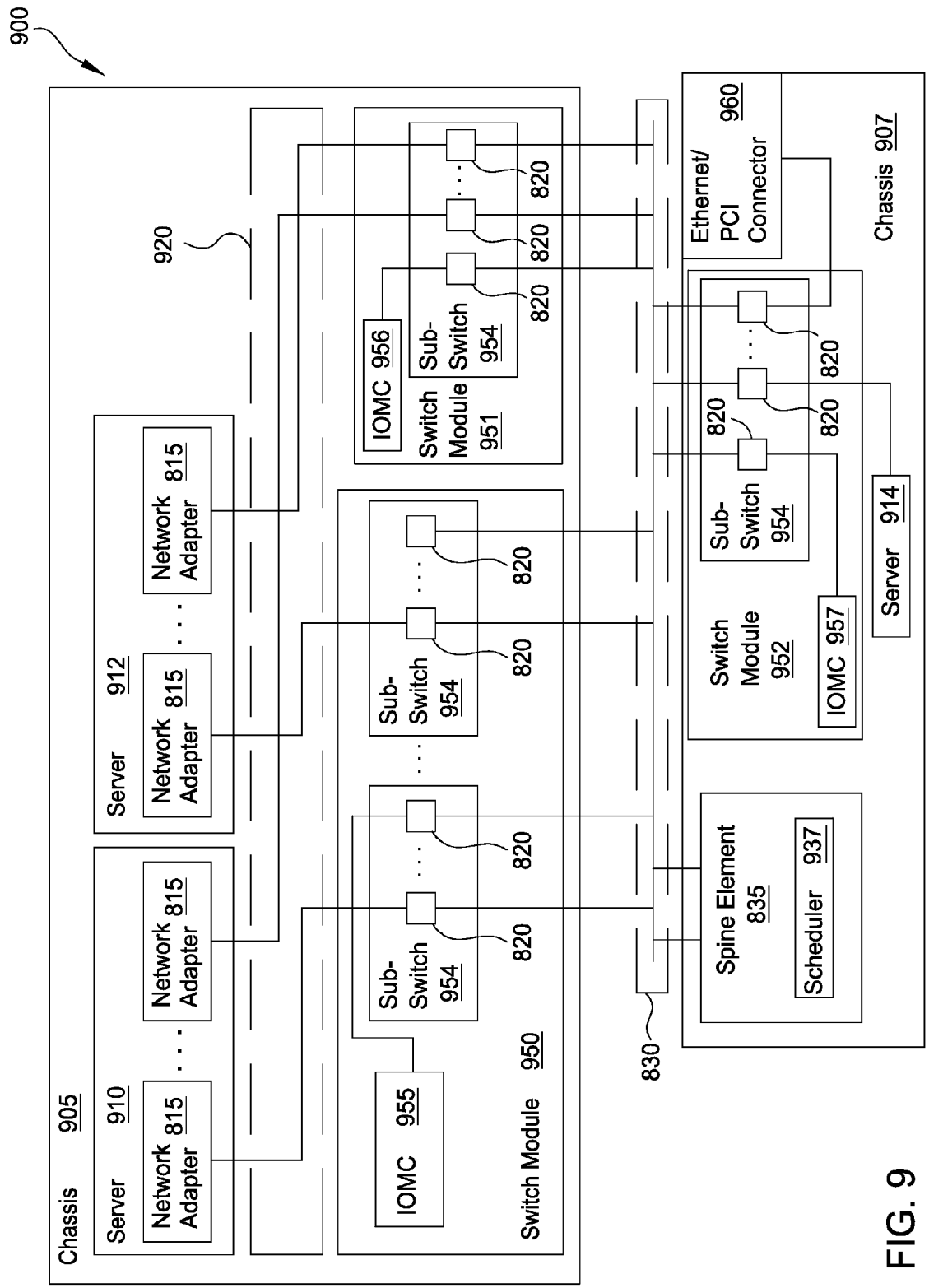
FIG. 9 illustrates a hardware representation of a system that implements a distributed network switch, according to one embodiment of the present disclosure.

FIG. 9 illustrates a hardware level diagram 900 of the system 800, according to one embodiment described herein. Server 910 and 912 may be physically located in the same chassis 905; however, the chassis 905 may include any number of servers. The chassis 905 also includes a plurality of switch modules 950, 951 that include one or more sub-switches 954 (i.e., a microchip). In one embodiment, the switch modules 950, 951, 952 are hardware components (e.g., PCB boards, FPGA boards, etc.) that provide physical support and connectivity between the network adapters 815 and the bridge elements 820. In general, the switch modules 950, 951, 952 include hardware that connects different chassis 905, 907 and servers 910, 912, 914 in the system 900 and may be a single, replaceable part in the computing system.

The switch modules 950, 951, 952 (e.g., a chassis interconnect element) include one or more sub-switches 954 and an IOMC 955, 956, 957. The sub-switches 954 may include a logical or physical grouping of bridge elements 820—e.g., each sub-switch 954 may have five bridge elements 820. Each bridge element 820 may be physically connected to the servers 910, 912. For example, a bridge element 820 may route data sent using either Ethernet or PCI communication protocols to other bridge elements 820 attached to the switching layer 830 using the routing layer. However, in one embodiment, the bridge element 820 may not be needed to provide connectivity from the network adapter 815 to the switching layer 830 for PCI or PCIe communications.

The spine element 835 allows for enhanced switching capabilities by connecting N number of sub-switches 954 using less than N connections, as described above. To facilitate the flow of traffic between the N switch elements, the spine element 835 has a hierarchical crossbar scheduler 937 which perform the arbitration operations described above. The inputs ports coming from different sub-switches 954 are grouped into input quads or groups on the spine element 835. The input groups communicate to the crossbar scheduler 937 when one or more of their input ports have packets targeting an output port of the spine element 835, which are also grouped into quads.

Each switch module 950, 951, 952 includes an IOMC 955, 956, 957 for managing and configuring the different hardware resources in the system 900. In one embodiment, the respective IOMC for each switch module 950, 951, 952 may be responsible for configuring the hardware resources on the particular switch module. However, because the switch modules are interconnected using the switching layer 830, an IOMC on one switch module may manage hardware resources on a different switch module. As discussed above, the IOMCs 955, 956, 957 are attached to at least one sub-switch 954 (or bridge element 820) in each switch module 950, 951, 952 which enables each IOMC to route commands on the switching layer 830. For clarity, these connections for IOMCs 956 and 957 have been omitted. Moreover, switch modules 951, 952 may include multiple sub-switches 954.

The dotted line in chassis 905 defines the midplane 920 between the servers 910, 912 and the switch modules 950, 951. That is, the midplane 920 includes the data paths (e.g., conductive wires or traces) that transmit data between the network adapters 815 and the sub-switches 954.

Each bridge element 820 connects to the switching layer 830 via the routing layer. In addition, a bridge element 820 may also connect to a network adapter 815 or an uplink. As used herein, an uplink port of a bridge element 820 provides a service that expands the connectivity or capabilities of the system 900. As shown in chassis 907, one bridge element 820 includes a connection to an Ethernet or PCI connector 960. For Ethernet communication, the connector 960 may provide the system 900 with access to a LAN or WAN (e.g., the Internet). Alternatively, the port connector 960 may connect the system to a PCIe expansion slot—e.g., PCIe device 850. The device 850 may be additional storage or memory which each server 910, 912, 914 may access via the switching layer 830. Advantageously, the system 900 provides access to a switching layer 830 that has network devices that are compatible with at least two different communication methods.

As shown, a server 910, 912, 914 may have a plurality of network adapters 815. This provides redundancy if one of these adapters 815 fails. Additionally, each adapter 815 may be attached via the midplane 920 to a different switch module 950, 951, 952. As illustrated, one adapter of server 910 is communicatively coupled to a bridge element 820 located in switch module 950 while the other adapter is connected to a bridge element 820 in switch module 951. If one of the switch modules 950, 951 fails, the server 910 is still able to access the switching layer 830 via the other switching module. The failed switch module may then be replaced (e.g., hot-swapped) which causes the IOMCs 955, 956, 957 and bridge elements 820 to update the routing tables and lookup tables to include the hardware elements on the new switching module.

Figure 10:
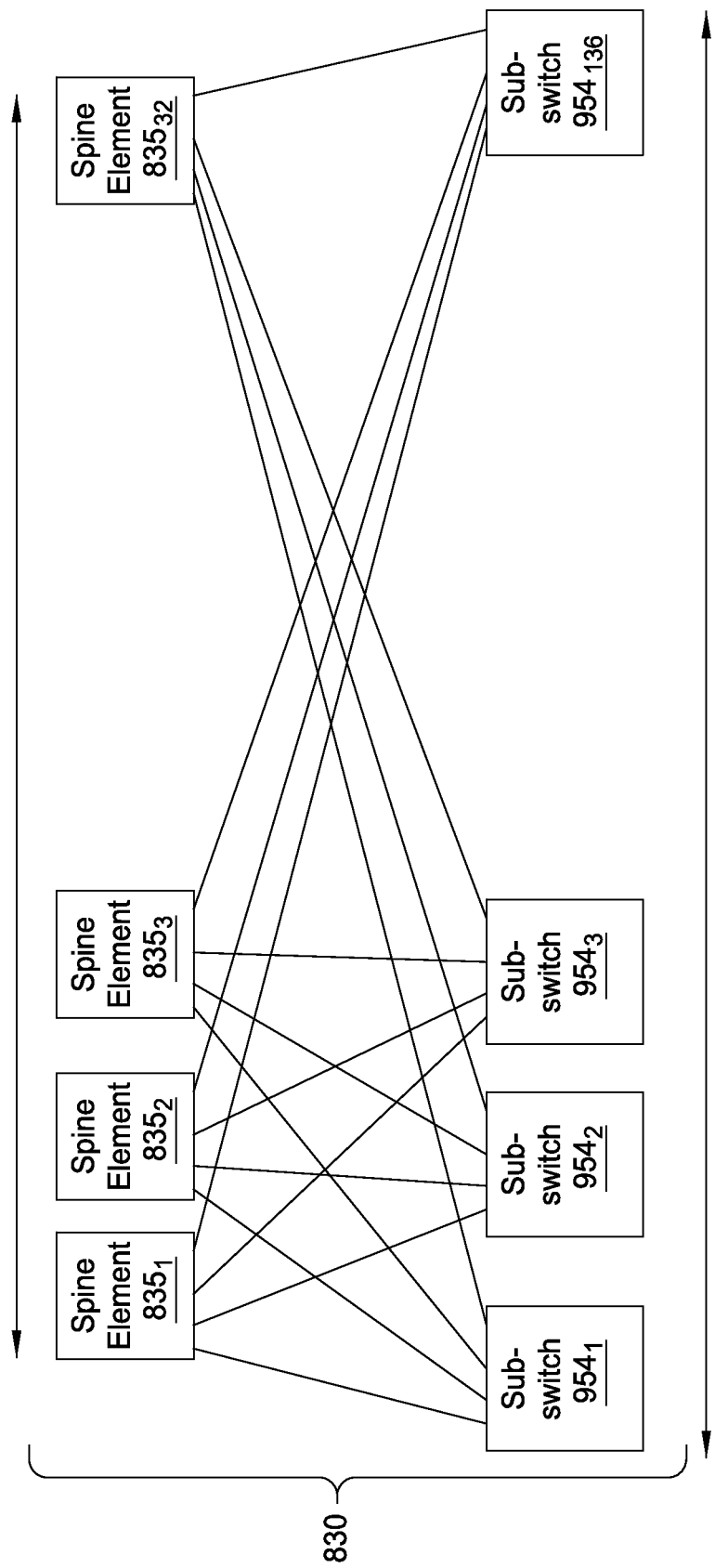
FIG. 10 illustrates one embodiment of the virtual switching layer shown in FIG. 8.

FIG. 10 illustrates the virtual switching layer 830, according to one embodiment described herein. As shown, the switching layer 830 may use a spine-leaf architecture where each sub-switch $954_{1\text{-}136}$ (i.e., a leaf node) is attached to at least one spine node $935_{1\text{-}32}$. The spine nodes $835_{1\text{-}32}$ route cells received from the sub-switch $954_N$ to the correct spine node which then forwards the data to the correct sub-switch $954_N$. That is, no matter the sub-switch $954_N$ used, a cell (i.e., data packet) can be routed to another other sub-switch $954_N$ located on any other switch module $954_{1\text{-}N}$. Although 136 sub-switches and 32 spine elements are illustrated in FIG. 10, embodiments disclosed herein are not limited to such a configuration, as broader ranges are contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method for scheduling a crossbar using distributed request-grant-accept arbitration between input group arbiters and output group arbiters in a switch unit, the method comprising:
   receiving, at an output group arbiter communicably coupled to an output link group comprising a plurality of output links of the switch unit, an indication that the output link group has won an arbitration slot, wherein multiple output links of the output link group are candidates able to satisfy the arbitration slot, and wherein the received indication comprises an indication that the output link group has won the arbitration slot in a grant phase of request-grant-accept arbitration; and
   during the grant phase of the request-grant-accept arbitration:
      determining a first output link identifier having a highest priority within an ordered queue among output link identifiers in the ordered queue matching the candidates able to satisfy the arbitration slot,
      selecting a first output link of the output link group corresponding to the first output link identifier to satisfy the arbitration slot and issue a grant, and
      updating, by operation of one or more computer processors, the ordered queue based on the selected first output link, wherein the first output link identifier is moved to a bottom of the ordered queue.

2. The method of claim 1, further comprising, receiving indication comprising an indication that a group of input links has won another arbitration slot in an accept phase of the request-grant-accept arbitration, wherein an input group arbiter is communicably coupled to the group of input links of the switch unit, and wherein the input group arbiter is configured to select one of multiple input links in the croup of input links that are candidates able to accept a grant to satisfy the other arbitration slot based on priorities associated with identifiers of the multiple input links within another ordered queue.

3. The method of claim 1, further comprising:
   inserting the output link identifiers into the ordered queue, wherein each output link identifier corresponds to an output link of the output link group.

4. The method of claim 1, wherein updating, by operation of the one or more computer processors, the ordered queue based on the selected first link further comprises:
   shifting up the other output link identifiers within the ordered queue.

5. The method of claim 1, wherein determining the first output link identifier having the highest priority within the ordered queue among the output link identifiers in the ordered queue matching the candidates able to satisfy the arbitration slot further comprises:
   determining a second output link identifier in the ordered queue does not match the candidates able to satisfy the arbitration slot,
   wherein the second output link identifier has a higher priority within the ordered queue than the first output link identifier, and
   wherein updating, by operation of the one or more computer processors, the ordered queue based on the selected first output link further comprises maintaining a position of the second output link identifier within the ordered queue.

6. The method of claim 1, further comprising:
   receiving, at the output group arbiter, a second indication that the output link group has won a second arbitration slot, wherein only a second output link of the output link group is able to satisfy the second arbitration slot;
   selecting the second output link of the output link group to satisfy the second arbitration slot; and
   updating, by operation of the one or more computer processors, the ordered queue based on the selected second output link, wherein a second output link identifier corresponding to the second output link is moved to the bottom of the ordered queue.

7. The method of claim 1, wherein:
   multiple output group arbiters which operate in parallel are each coupled to a respective output link group comprising a plurality of output links of the switch unit and each of the output group arbiters selects a respective output link by performing the determining, selecting, and updating steps; and
   the output links selected by the multiple output group arbiters are combined in a group grant vector.

* * * * *